United States Patent
Moore et al.

(10) Patent No.: US 12,017,409 B2
(45) Date of Patent: Jun. 25, 2024

(54) MULTI-NOZZLE EXTRUDER AND METHOD FOR OPERATING A MULTI-NOZZLE EXTRUDER DURING ADDITIVE MANUFACTURING

(71) Applicant: Xerox Corporation, Norwalk, CT (US)

(72) Inventors: Steven R. Moore, Pittsford, NY (US); Christopher G. Lynn, Wolcott, NY (US)

(73) Assignee: Xerox Corporation, Norwalk, CT (US)

( * ) Notice: Subject to any disclaimer, the term of this patent is extended or adjusted under 35 U.S.C. 154(b) by 483 days.

(21) Appl. No.: 16/898,004

(22) Filed: Jun. 10, 2020

(65) Prior Publication Data

US 2021/0387410 A1 Dec. 16, 2021

(51) Int. Cl.
| | |
|---|---|
| *B29C 48/255* | (2019.01) |
| *B29C 64/118* | (2017.01) |
| *B29C 64/209* | (2017.01) |
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.
CPC ........ *B29C 64/209* (2017.08); *B29C 48/2556* (2019.02); *B29C 64/118* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 48/2556; B29C 48/345; B29C 48/50; B29C 64/10; B29C 64/106; B29C 64/118; B29C 64/20; B29C 64/209; B29C 64/227; B29C 64/236; B29C 64/241; B29C 64/245; B29C 64/321; B29C 64/386; B29C 64/393; B29K 2101/12; B33Y 10/00; B33Y 30/00; B33Y 50/02; B33Y 70/00

See application file for complete search history.

(56) References Cited

U.S. PATENT DOCUMENTS

| | | | |
|---|---|---|---|
| 7,699,674 B1 * | 4/2010 | Wald | B63H 25/30 |
| | | | 440/58 |
| 2012/0119408 A1 | 5/2012 | Schmidt | |
| 2015/0056432 A1 | 2/2015 | Solberg | |
| 2018/0207863 A1 | 7/2018 | Porter et al. | |
| 2018/0291933 A1 * | 10/2018 | Weickel | B33Y 70/00 |
| 2019/0039310 A1 | 2/2019 | Busbee et al. | |
| 2019/0322043 A1 * | 10/2019 | Mantell | B29C 64/209 |

* cited by examiner

*Primary Examiner* — Michael A Tolin
(74) *Attorney, Agent, or Firm* — Maginot Moore & Beck LLP

(57) ABSTRACT

An additive manufacturing system has a controller configured to operate a spool valve to open and close nozzles in a multi-nozzle extruder while the extruder moves in an X-Y plane and rotates about an axis perpendicular to the XY plane to form swaths in the X-Y plane. The controller operates one actuator to rotate the multi-nozzle extruder so a longitudinal axis of a nozzle array in the extruder remains perpendicular to a movement path for the extruder and to operate another actuator to move a cylindrical member of the spool valve.

15 Claims, 14 Drawing Sheets

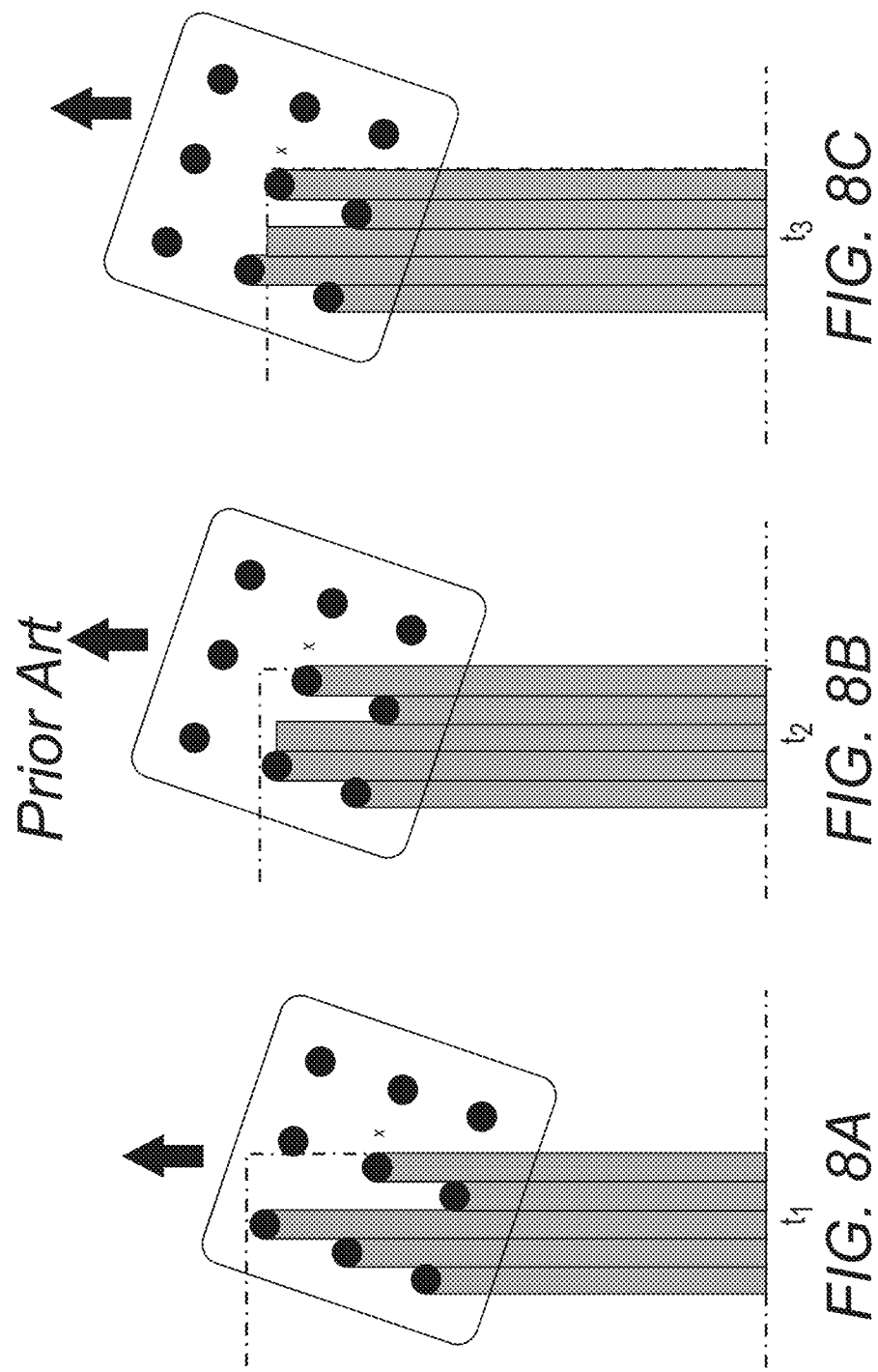

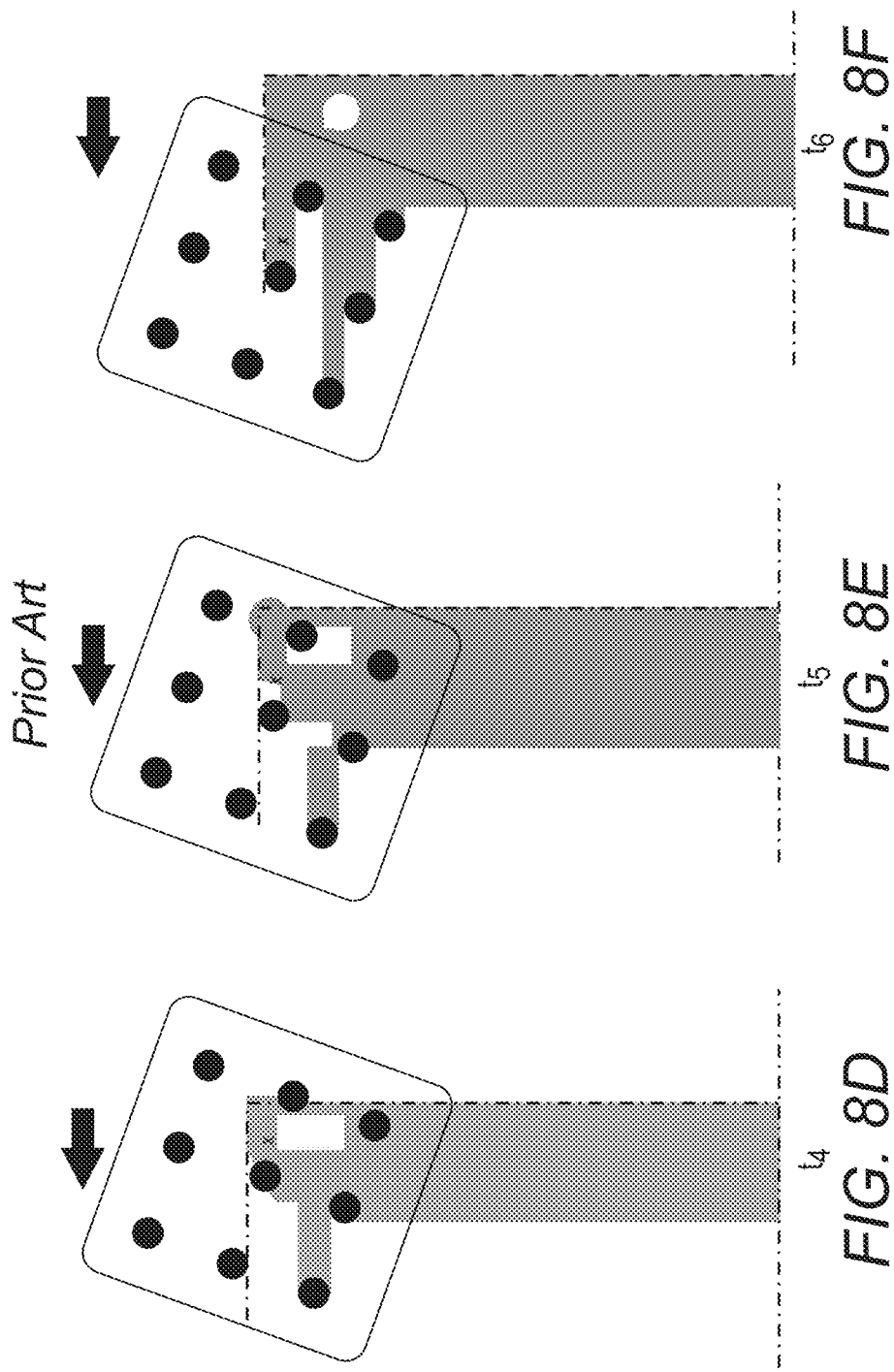

MULTI-NOZZLE EXTRUDER AND METHOD FOR OPERATING A MULTI-NOZZLE EXTRUDER DURING ADDITIVE MANUFACTURING

TECHNICAL FIELD

This disclosure is directed to multi-nozzle extruders used in three-dimensional object printers and, more particularly, to the valves in such multi-nozzle extruders.

BACKGROUND

Three-dimensional (3D) printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extruders that soften or melt solid extrusion material, such as ABS plastic, into thermoplastic material and then emit the thermoplastic material in a predetermined pattern. The printer typically operates the extruder to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Many existing three-dimensional printers use a single extruder that extrudes material through a single nozzle. The printhead moves in a predetermined path to emit the thermoplastic build material onto selected locations of a support member or previously deposited layers of the three-dimensional printed object based on model data for the three-dimensional printed object. However, using a printhead with only a single nozzle to emit the thermoplastic build material often requires considerable time to form a three-dimensional printed object. Additionally, a printhead with a larger nozzle diameter can form three-dimensional printed objects more quickly but loses the ability to emit build material in finer shapes for higher detailed objects while nozzles with narrower diameters can form finer detailed structures but require more time to build three-dimensional objects.

To address the limitations of single nozzle extruders, multi-nozzle extruders have been developed. In these multi-nozzle extruders, the nozzles are formed in a common faceplate and the thermoplastic materials extruded through the nozzles can come from one or more manifolds. In extruders having a single manifold, all of the nozzles are fluidly connected to the manifold so they extrude the same material, but the fluid path from the manifold to each nozzle can include a valve that is operated to open and close the nozzles selectively. This ability to regulate the flow of thermoplastic material to the nozzles enables the shape of a swath of thermoplastic material extruded from the nozzles to be varied by changing the number of nozzles extruding material and selecting which nozzles are extruding thermoplastic material. In extruders having a plurality of manifolds, the nozzles connected to one manifold can extrude a different thermoplastic material than a nozzle connected to another manifold. This ability to emit different thermoplastic materials from different manifolds enables the composition of the thermoplastic material in a swath to vary. Again, these variations are achieved by changing the number of nozzles extruding thermoplastic material and selecting which nozzles extrude thermoplastic material. These multi-nozzle extruders enable different thermoplastic materials to be extruded from different nozzles and they can be used to form an object without having to coordinate the movement of different extruder bodies. These different thermoplastic materials can enhance the ability of the additive manufacturing system to produce objects with different colors, physical properties, and configurations. Additionally, by changing the number of nozzles extruding material, the size of the swaths produced can be altered to provide narrow swaths in areas where precise feature formation is required, such as object edges, and to provide broader swaths to quickly form areas of an object, such as its interior regions.

A previously known extruder faceplate is shown in FIG. 7. The faceplate 260 has 9 nozzles arranged in a 3×3 array 604 when viewed from below the faceplate. The center distance between adjacent nozzles is 1.2 mm. The array is inclined at a 72° angle with respect to the X axis and 18° with respect to the Y axis of the platform on which the object is formed. These X and Y axes are orthogonal to one another in the plane of the faceplate and intersect one another at the center nozzle. Movement along or parallel to the X axis can be described as being bidirectional in the 0° and 180° directions while movement along or parallel to the Y axis can be described as being bidirectional in the 90° and 270° directions. Movement along these headings produces an effective nozzle pitch of 0.4 mm. In one embodiment of this known system, the nozzle diameter is 0.4 mm and the extruder faceplate is oriented at an 72° angle with respect to the X axis. This orientation is used because when all of the nozzles are opened and the extruder is moved along one of the 0°, 90% 180% and 270° headings, the emitted thermoplastic material from the nozzles form a solid swath of parallel beads of extruded material that are constrained by the faceplate to form ribbons that contact one another in a cross-process direction that is perpendicular to the direction of extruder movement, also known as a process direction. This solid swath is especially useful in quickly filling the interior areas of an object.

As previously noted, the nozzles of the multi-nozzle extruder are independently operated using a valve mechanism. Such a known multi-nozzle extruder is shown in FIG. 9. As shown in the figure, the valve pins, one for each nozzle in the extruder, enter the extruder and are configured for bidirectional movement to block and open each nozzle selectively. Actuators in the valve assembly are operated by the controller to move the valve pins. This ability to selectively open and close the nozzles enables the extruder to form acute angle corners in an object. Such an operation is shown in FIG. 8A to 8F. The corner of the object to be formed is shown with dashed lines in the figure. As the extruder approaches the position where the corner is to be formed at a heading of 90°, five nozzles are open (FIG. 8A). The leading nozzle is closed as it arrives at the perimeter being formed for the object (FIG. 8B). Likewise, the next leading nozzle is closed at the same perimeter so only three nozzles remain open and the movement of the extruder at this heading is stopped (FIG. 8C). The extruder is now moved at a heading of 180° and as two of the nozzles previously outside the perimeter approach the perimeter and enter the interior of the object, they are opened (FIG. 8D and FIG. 8E). These five nozzles remain open as the extruder continues to move at the 180° heading to continue formation of the perimeter swath (FIG. 8F).

While a multi-nozzle extruder is useful for forming an object more quickly and precisely than a single nozzle extruder, some issues arise with its operation. For example, when the extruder discussed above moves at a heading other than 0°, 90°, 180°, and 270°, the effective pitch varies. The least effective pitch occurs at movement of the extruder at one of the extruder angles of orientation, which correspond to headings of 72°, 162°, 252° and 342° in the extruder being discussed, and that effective pitch is 1.2 mm since three nozzles are aligned in the process direction to form a single line that is separated from the other two lines also formed by three aligned nozzles. Thus, no material contact occurs between the lines in the cross-process direction. This issue is addressed by slowing the travel speed of the extruder when it is moving at a heading other than a heading of 0°, 90°, 180°, and 270°.

Another issue with this type of multi-nozzle extruder arises from the mechanism for closing the nozzles. When a nozzle is closed, a tapered pin is driven downward into an upper face of a nozzle to prevent thermoplastic material from exiting the nozzle. The movement of the pin to close the nozzle displaces material ahead of it and causes a 'slug' of thermoplastic material to be ejected as the nozzle stops extruding. This slug results in extra, unwanted thermoplastic material being deposited at pin actuations. Thus, parts requiring tight tolerances for object features need to be printed with minimal pin actuations.

Another issue arising from the pin movement in these previously known extruders is leakage of thermoplastic material from the passageway of the pin into the extruder. These passageways are difficult to seal and the pressure of the thermoplastic material within the manifold of the extruder urges the material against the seals and some leakage can occur. This leaked material can increase drag on the pin and slow the pin actuation time. Delay in the actuation of even a single pin, in some situations, can necessitate the rebuilding of the extruder and valve assembly interface. An extruder that mitigates these issues in known multi-nozzle extruders while maintaining the ability of acute angle corner formation and wide swath paths would be beneficial.

SUMMARY

A new multi-nozzle extruder includes a valve configuration that mitigates issues with known multi-nozzle extruders while maintaining the ability of acute angle corner formation and wide swath paths. The extruder includes a platform configured to support an object during manufacturing, an extruder having a housing with a cylindrical bore and a plurality of nozzles in a planar member affixed to the housing, a spool valve being positioned within the cylindrical bore, at least one actuator operatively connected to the platform or the extruder to move the extruder relative to the platform in an X-Y plane that is parallel with the platform and to rotate the extruder about an axis perpendicular to the X-Y plane, a spool actuator operatively connected to the spool valve, the spool actuator being configured to move the spool valve along a longitudinal axis of the cylindrical bore bidirectionally, and a controller operatively connected to the extruder, the at least one actuator, and the spool actuator. The controller is configured to operate the at least one actuator to move the extruder in the X-Y plane and rotate the extruder about the axis perpendicular to the X-Y plane and operate the spool actuator to move the spool valve within the cylindrical bore of the housing to open and close nozzles in the planar member while the extruder is being moved in the X-Y plane.

A method of operating the new extruder mitigates issues in known multi-nozzle extruders while maintaining the ability of acute angle corner formation and wide swath paths. The method includes operating with a controller at least one actuator to move an extruder in a X-Y plane and to rotate the extruder about an axis perpendicular to the X-Y plane, and operating with the controller a spool actuator to move a spool valve within a cylindrical bore of a housing of the extruder to open and close nozzles in a planar member attached to the housing of the extruder while the extruder is being moved in the X-Y plane.

BRIEF DESCRIPTION OF THE DRAWINGS

The foregoing aspects and other features of an extruder that mitigates issues in known multi-nozzle extruders while maintaining the ability of acute angle corner formation and wide swath paths are explained in the following description, taken in connection with the accompanying drawings.

FIG. 8A to FIG. 8F depicts the formation of a right-angle corner by the prior art extruder faceplate of FIG. 7.

DETAILED DESCRIPTION

Figure 1:
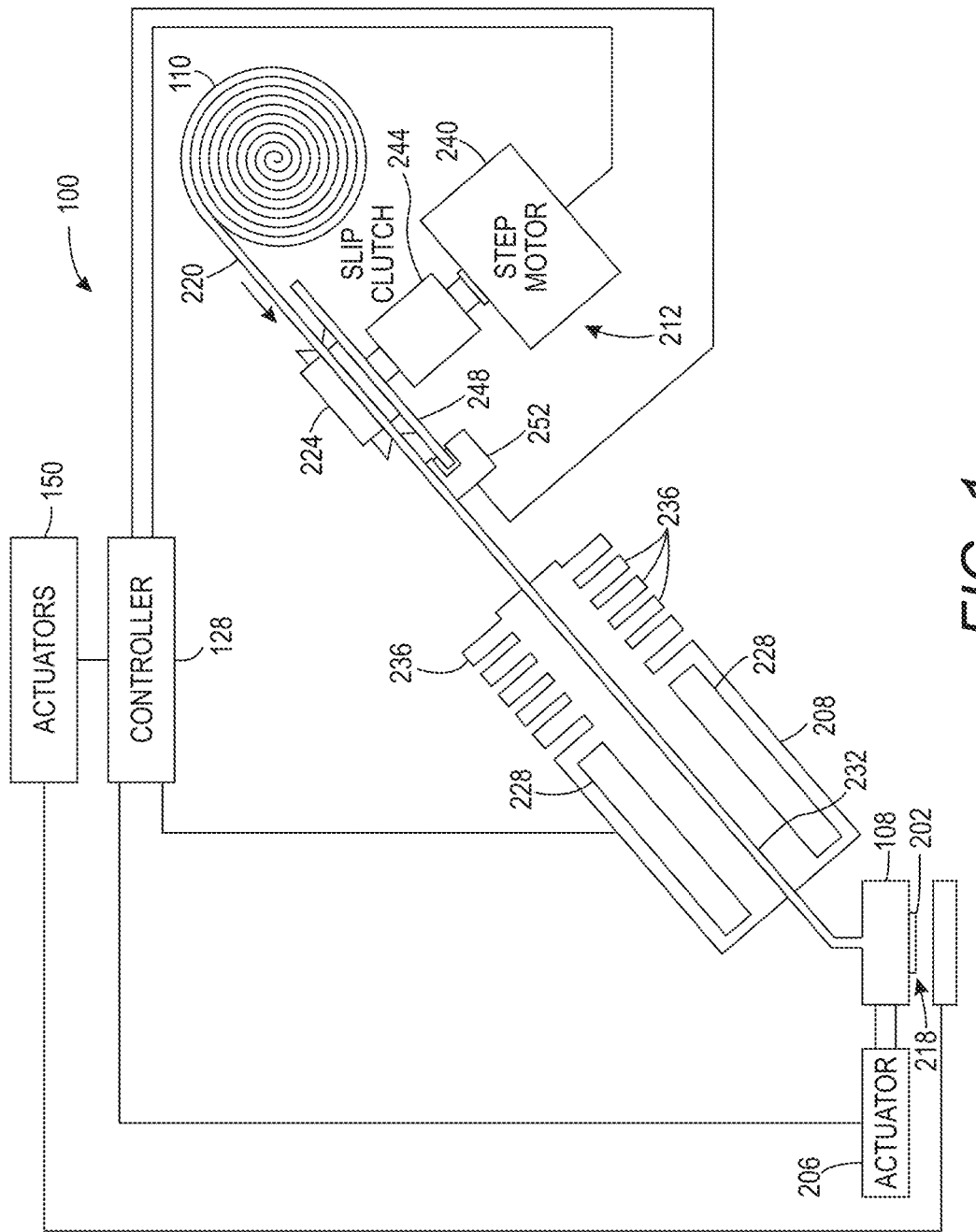
FIG. 1 depicts an additive manufacturing system an extruder that mitigates issues in known multi-nozzle extruders while maintaining the ability of acute angle corner formation and wide swath paths.

For a general understanding of the environment for the device disclosed herein as well as the details for the device, reference is made to the drawings. In the drawings, like reference numerals designate like elements.

As used herein, the term "extrusion material" refers to a solid material that is softened or melted to form thermoplastic material to be emitted by an extruder in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder. Examples of support materials include, but are not limited to, high-impact polystyrene (HIPS), polyvinyl alcohol (PVA), and other materials capable of extrusion after being thermally treated. In some extrusion printers, the extrusion material is supplied as continuous elongated length of material commonly known as a "filament." This filament is provided in a solid form by one or more rollers pulling the extrusion material filament from a spool or other supply and feeding the filament into a heater that is fluidly connected to the extruder. Although the illustrated examples use solid extrusion material that is supplied as filament to the heaters, other solid extrusion material supplies can be used, such as particulate or spherical ball solid extrusion materials. The heater softens or melts the solid extrusion material filament to form a thermoplastic material that flows into the extruder. When the new valve discussed in more detail below is positioned between the nozzles and operated, a portion of the thermoplastic material flows from the inlet of the extruder through one or more of the nozzles and is emitted as a stream of thermoplastic material from the nozzles opened by the valve. As used herein, the term "melt" as applied to solid extrusion material refers to any elevation of temperature for the solid extrusion material that softens or changes the phase of the solid extrusion material to enable extrusion of the resulting thermoplastic material through one or more nozzles in an extruder during operation of a three-dimensional object printer. As used in this document, the term "thermoplastic material" means solid extrusion material that has been melted. As those of skill in the art recognize, certain amorphous extrusion materials do not transition to a pure liquid state during operation of the heater.

As used herein, the term "extruder" refers to a component of a printer that receives thermoplastic material and extrudes it selectively through one or more nozzles. The extruder discussed more fully below includes a spool valve and a new nozzle configuration that enables thermoplastic material to flow through nozzles selectively when the valve is electronically operated by a controller. As used herein, the term "nozzle" refers to an orifice in a faceplate of an extruder that is fluidly connected to the source of thermoplastic material by a valve and through which thermoplastic material is emitted towards a material receiving surface. During operation, the nozzle can extrude a substantially continuous linear swath of the thermoplastic material along the process path of the extruder. A controller operates the spool valve to control the size and to some degree the shape of the extruded thermoplastic material. As used in this document, the term "spool valve" means a member that is moved within a chamber to completely or partially block an inlet that can feed all of the nozzles in an extruder.

As used herein, the term "swath" refers to any pattern of the thermoplastic material that the extruder forms on a material receiving surface during a three-dimensional object printing operation. Common swaths include straight-line linear arrangements of thermoplastic material and curved swaths. In some configurations, the extruder extrudes the thermoplastic material in a continuous manner to form the swath with a contiguous mass of the extrusion material in both process and cross-process directions, while in other configurations the extruder operates in an intermittent manner to form smaller groups of thermoplastic material that are arranged along a linear or curved path. The three-dimensional object printer forms various structures using combinations of different swaths of the thermoplastic material. Additionally, a controller in the three-dimensional object printer uses object image data and extruder path data that correspond to different swaths of thermoplastic material prior to operating the extruder to form each swath of thermoplastic material. As described below, the controller adjusts the operation of the spool valve and the rotation of the extruder to form multiple swaths of thermoplastic material through one or more nozzles during a three-dimensional printing operation.

As used herein, the term "process direction" refers to a direction of a straight-line motion path between an extruder and a material receiving surface that receives thermoplastic material extruded from one or more nozzles in the extruder. In the case of a curved path, the straight-line motion path refers to the tangent to the curve. The material receiving surface is either a support member that holds a three-dimensional printed object or a surface of the partially formed three-dimensional object during an additive manufacturing process. In the illustrative embodiments described herein, one or more actuators move the extruder about the support member, but alternative system embodiments move the support member to produce the relative motion in the process direction while the extruder remains stationary. Some systems use a combination of both systems for different axes of motion.

As used herein, the term "cross process direction" refers to an axis that is perpendicular to the process direction and parallel to the extruder faceplate and the material receiving surface. The process direction and cross-process direction refer to the relative path of movement of the extruder and the surface that receives the thermoplastic material. In some configurations, the extruder includes an array of nozzles that can extend in the process direction, the cross-process direction, or both. Adjacent nozzles within the extruder are separated by a predetermined distance in the cross-process direction. In some configurations, the system rotates the extruder to adjust the cross-process direction distance that separates different nozzles in the extruder to adjust the corresponding cross-process direction distance that separates the lines of thermoplastic material that are extruded from the nozzles in the extruder as the lines form a swath.

During operation of the additive manufacturing system, an extruder moves in the process direction along both straight and curved paths relative to a surface that receives thermoplastic material during the three-dimensional object printing process. Additionally, an actuator in the system optionally rotates the extruder about the Z axis to adjust the effective cross-process distance that separates nozzles in the extruder so the extruder forms two or more lines of thermoplastic material with predetermined distances between each line of the thermoplastic material. As used in this document, the term "Z-direction" refers to a direction of movement that is perpendicular to the plane in which the process direction and cross-process direction are orthogonal to one another, which is sometimes called the X-Y plane in this document. The extruder moves both along the outer perimeter to form outer walls of a two-dimensional region in a layer of the printed object and within the perimeter to fill all or a portion of the two-dimensional region within the thermoplastic material perimeter.

FIG. 1 depicts an additive manufacturing system 100 having an extruder 108 that includes a spool valve to control the extrusion of thermoplastic material through nozzles in a faceplate as described in more detail below. Although the printer 100 is depicted as a printer that uses planar motion to form an object, other printer architectures can be used with the extruder and the controller configured to regulate the rotation of the extruder as described in this document.

These architectures include delta-bots, selective compliance assembly robot arms (SCARAs), multi-axis printers, non-Cartesian printers, and the like. The motions in these alternative embodiments still have process and cross-process directions as defined above and the nozzle spacing in the extruders of these embodiments still define the nozzle spacing with respect to the cross-process direction. Each nozzle 218 terminates at a faceplate 260 so the thermoplastic material extruded from the nozzles can be manipulated by the faceplate for spreading.

In the embodiment of FIG. 1, a spool valve within the extruder 108 is operatively connected to an actuator 206 that is operated by the controller 128 so the controller can regulate the flow of thermoplastic material to the plurality of nozzles in the faceplate 202 of the extruder 108. Specifically, the controller 128 operates the actuator 206 to move the spool valve to extrude thermoplastic material selectively from the nozzles and form swaths of thermoplastic material in each layer of a three-dimensional printed object. The details of the spool valve and its control are described in more detail below with reference to FIG. 2 and FIG. 3. The actuator 206 is called a spool actuator and that term means a component configured to provide a motive force to the spool to at least translate and, in some embodiments, translate and rotate the spool within the bore of a housing.

The system 100 of FIG. 1 also includes an extrusion material dispensing system 212 that feeds the heater 208 that is connected to the inlet 216 of the extruder 108. The solid extrusion material from the supply 110 is fed to the heater 208 at a rate that maintains the pressure of the thermoplastic material in the extruder within a predetermined range during operation of the system 100. The dispensing system 212 is one embodiment that is suitable for regulating pressure of the thermoplastic material in the extruder 108. Additionally, the controller 128 is operatively connected to an actuator for dispensing system 212 to control the rate at which the dispensing system 212 delivers extrusion material from the supply 110 to the heater 208. The heater 208 softens or melts the solid extrusion material 220 fed to the heater 208 via drive roller 224. Actuator 240 drives the roller 224 and is operatively connected to the controller 128 so the controller can regulate the speed at which the actuator drives the roller 224. Another roller opposite roller 224 is free-wheeling so it follows the rate of rotation at which roller 224 is driven. While FIG. 1 depicts a feed system that uses an electromechanical actuator and the driver roller 224 as a mechanical mover to move the filament 220 into the heater 208, alternative embodiments of the dispensing system 212 use one or more actuators to operate a mechanical mover in the form of a rotating auger or screw. The auger or screw moves solid phase extrusion material from a supply 110 in the form of solid extrusion material powder or pellets into heater 208.

In the embodiment of FIG. 1, the heater has a body formed from stainless steel that includes one or more heating elements 228, such as electrically resistive heating elements, which are operatively connected to the controller 128. Controller 128 is configured to connect the heating elements 228 to electrical current selectively to soften or melt the filament of solid extrusion material 220 in the channel or channels within the heater 208. While FIG. 1 shows the heater 208 receiving extrusion material in a solid phase as solid filament 220, in alternative embodiments, the heater can receive the extrusion material in solid phase as powdered or pelletized extrusion material. Cooling fins 236 attenuate heat in the channels upstream from the heater. A portion of the solid extrusion material that remains solid in a channel at or near the cooling fins 236 forms a seal in the channel that prevents thermoplastic material from exiting the heater from any opening other than the connection to the extruder 108, which maintains a temperature that keeps the extrusion material in a thermoplastic state as it enters the extruder. The extruder 108 can also include additional heating elements to maintain an elevated temperature for the thermoplastic material within the extruder to maintain a predetermined temperature around the nozzles that keeps the material in a thermoplastic state so it does not begin solidifying as it travels through the nozzles in the faceplate. In some embodiments, a thermal insulator covers portions of the exterior of the extruder 108 to maintain a temperature within the extruder.

To maintain a fluid pressure of the thermoplastic material within the extruder in a predetermined range, avoid damage to the extrusion material, and control the extrusion rate through the nozzles, a slip clutch 244 is operatively connected to the drive shaft of the actuator 240 that feeds filament from a supply 110 to the heater. As used in this document, the term "slip clutch" refers to a device that applies frictional force to an object to move the object up to a predetermined set point. When the range about the predetermined set point for the frictional force is exceeded, the device slips so it no longer applies the frictional force to the object. The slip clutch enables the force exerted on the filament 220 by the roller 224 to remain within constraints corresponding to the strength of the filament so no matter how frequently, how fast, or how long the actuator 240 is driven, the risk of filament breakage remains low. This constant force can be maintained by either driving the actuator 240 at a speed that is higher than the fastest expected rotational speed of the filament drive roller 224 or by putting an encoder wheel 248 on the roller 224 and sensing the rate of rotation with a sensor 252. The signal generated by the sensor 252 indicates the angular rotation of the roller 224 and the controller 128 receives this signal to identify the speed of the roller 224. The controller 128 is further configured to adjust the signal provided to the actuator 240 to control the speed of the actuator. When the controller is configured to control the speed of the actuator 240, the controller 128 operates the actuator 240 so its average speed is slightly faster than the rotation of the roller 224. This operation ensures that the torque on the drive roller 224 is always a function of the slip clutch torque.

The controller 128 has a set point stored in memory connected to the controller that identifies the slightly higher speed of the actuator output shaft over the rotational speed of the roller 224. As used in this document, the term "set point" means a parameter value that a controller uses to operate components to keep the parameter corresponding to the set point within a predetermined range about the set point. For example, the controller 128 changes a signal that operates the actuator 240 to rotate the output shaft at a speed identified by the output signal in a predetermined range about the set point. In addition to the commanded speed for the actuator, the number of nozzles opened or closed, and the torque set point for the clutch also affect the filament drive system 212 operation. The resulting rotational speed of the roller 224 is identified by the signal generated by the sensor 252. A proportional-integral-derivative (PID) controller within controller 128 identifies an error from this signal with reference to the differential set point stored in memory and adjusts the signal output by the controller to operate the actuator 240. Alternatively, the controller 128 can alter the torque level for the slip clutch or the controller 128 can both alter the torque level and adjust the signal with which the controller operates the actuator.

The slip clutch 244 can be a fixed or adjustable torque friction disc clutch, a magnetic particle clutch, a magnetic hysteresis clutch, a ferro-fluid clutch, an air pressure clutch, or permanent magnetic clutch. The clutch types that operate magnetically can have their torque set points adjusted by applying a voltage to the clutches. This feature enables the torque set point on the clutch to be changed with reference to print conditions. The term "print conditions" refers to parameters of the currently ongoing manufacturing operation that affect the amount of thermoplastic material required for adequate formation of the object. These print conditions include the type of extrusion material being fed to the extruder, the temperature of the thermoplastic material being emitted from the extruder, the speed at which the extruder is being moved in the X-Y plane, the position of the feature being formed on the object, the angle at which the extruder is being moved relative to the platform, and the like.

Figure 2A:
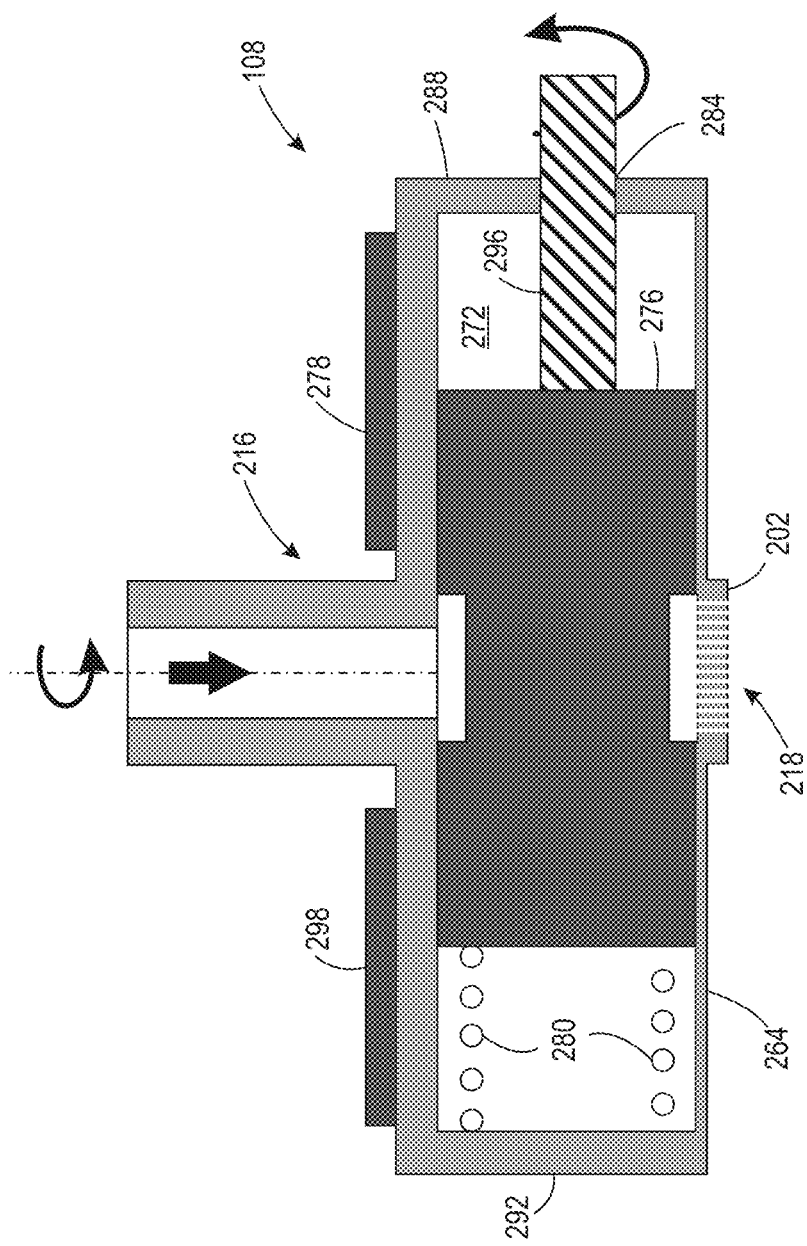
FIG. 2A is a side cross-sectional view of the extruder shown in FIG. 1

A side cross-sectional view of the extruder 108 is shown in FIG. 2A. The extruder 108 includes a housing 264 in which an inlet 216 is formed for connection to an outlet of the heater 208 so the extruder can receive thermoplastic material. Faceplate 202 is a planar member that is affixed to the housing 264 at an outlet that is diametrically opposite the inlet. A plurality of nozzles 218 arranged in an array are formed in the faceplate 202 by drilling or the like. The outlet has a diameter that corresponds to the length of the nozzle array in the faceplate so all of the nozzles can receive thermoplastic material when the reduced portion of the spool is opposite the nozzle array. The housing 264 is closed at each end of the bore 272 in which a spool 276 bidirectionally moves. A member 296 extends through an opening 284 in end wall 288 of the housing 264 to engage one end of the spool 276. A spring 280 is interposed in the bore of the housing between end wall 292 of the housing and the other end of the spool. The two end portions of the spool 276 have a diameter that closely approximates the diameter of the bore 272. The middle portion of the spool 276 has a reduced diameter so thermoplastic material flows around this portion of the spool from the inlet 216 to the outlet at the nozzles 218 in the faceplate 202 when any portion of the reduced diameter section is opposite the inlet 268. Heaters 298 are mounted to the exterior of the housing 264 to maintain the thermoplastic material in the bore within a predetermined temperature range that keeps the thermoplastic material flowable.

Figure 2B:
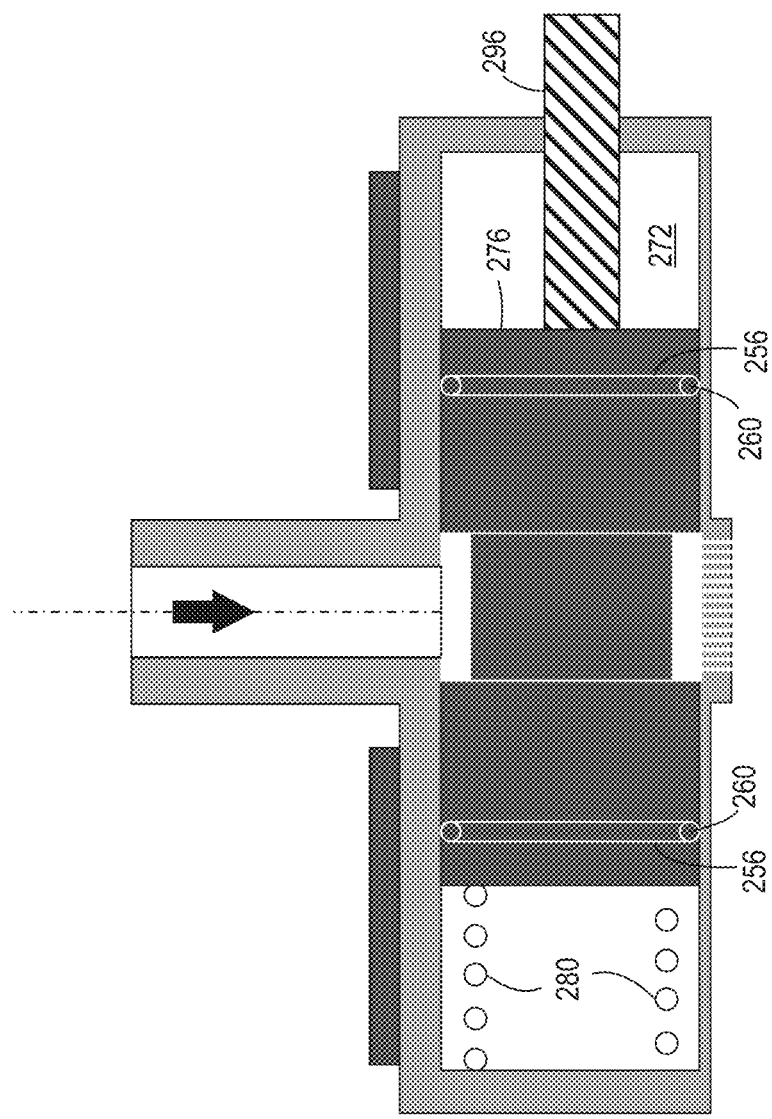
FIG. 2B is an alternative embodiment of the extruder shown in FIG. 2A that is configured with seals to help prevent loss of thermoplastic material.

In further detail, the extruder housing 264 has a precision bore 272. The sliding spool 276 in the bore has a precision outside diameter. Thermoplastic material enters from the inlet, flows around the reduced diameter section of the spool, and into the nozzles 218. The nozzles can be closed by positioning one of the larger diameter portions of the spool over a nozzle. In one embodiment, the extruder housing is a stainless steel cylinder with a reamed and honed bore. The radial clearance between the larger diameter portions of the spool and the cylindrical inner wall of the housing is 10 microns. A gap of this size helps prevent leakage of the thermoplastic material from the housing 264. Alternatively, the spool 276 can be configured with grooves 256 into which seals, such as O-rings 260, are positioned as shown in FIG. 2B. These seals are carried by the spool 276 as the spool is moved and help prevent the loss of the thermoplastic material. The seals are made of resilient material such as perfluoroelastomer. In the embodiments shown in FIGS. 2A and 2B, the member 296 is a fine pitch screw that is rotated by actuator 206 to push the spool 276 along the longitudinal axis of the bore 272. The spring 280 biases the opposite end of the spool to keep the spool seated against the screw when the rotation of the screw is reversed. By sliding the spool within the bore using the member, the nozzles can be sequentially opened from one end of the array to the other end. This movement requires that when only a single nozzle is to be opened, it must be either the left-most or right-most nozzle.

Figure 3:
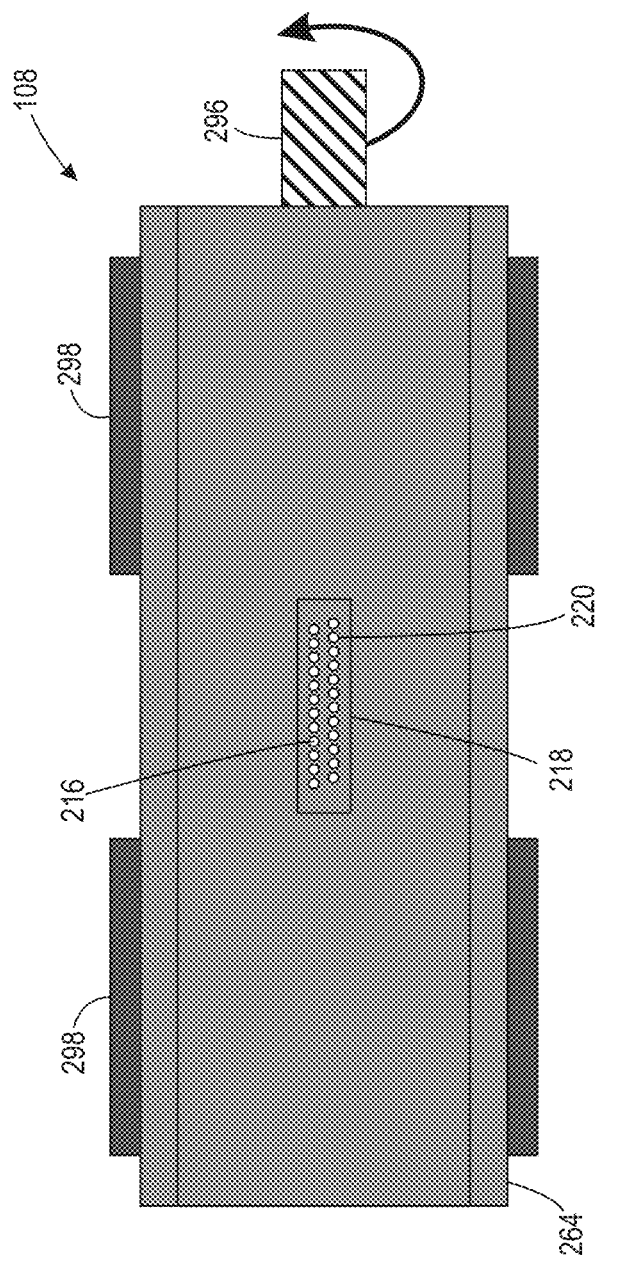
FIG. 3 is a bottom view of the extruder shown in FIG. 1.

A bottom view of the extruder 108 is shown in FIG. 3. The nozzles 218 are arranged in an array having two parallel rows 216, 220 with an effective spacing of 0.4 mm in the cross-process direction when the process direction movement of the extruder is perpendicular to the longitudinal axis of the array. The configuration of the extruder shown in FIG. 2A, FIG. 2B, and FIG. 3 provides for bidirectional rotation of the extruder about the Z-axis. Thus, by rotating the extruder about its Z-axis, the extruder can always be oriented so the longitudinal axis of the nozzle array is perpendicular to the process direction of travel. Consequently, the thermoplastic material emitted from a nozzle in one row is 0.4 mm in the cross-process direction from the adjacent nozzle in the other row provided the reduced portion of the spool is opposite the two nozzles. By offsetting the nozzles in one row of the nozzle array from the nozzles in the other row of the nozzle array to achieve this goal, a contiguous swath of melted extrusion material can be formed by the nozzles provided the reduced diameter section of the spool is opposite all of the nozzles.

Figure 4:
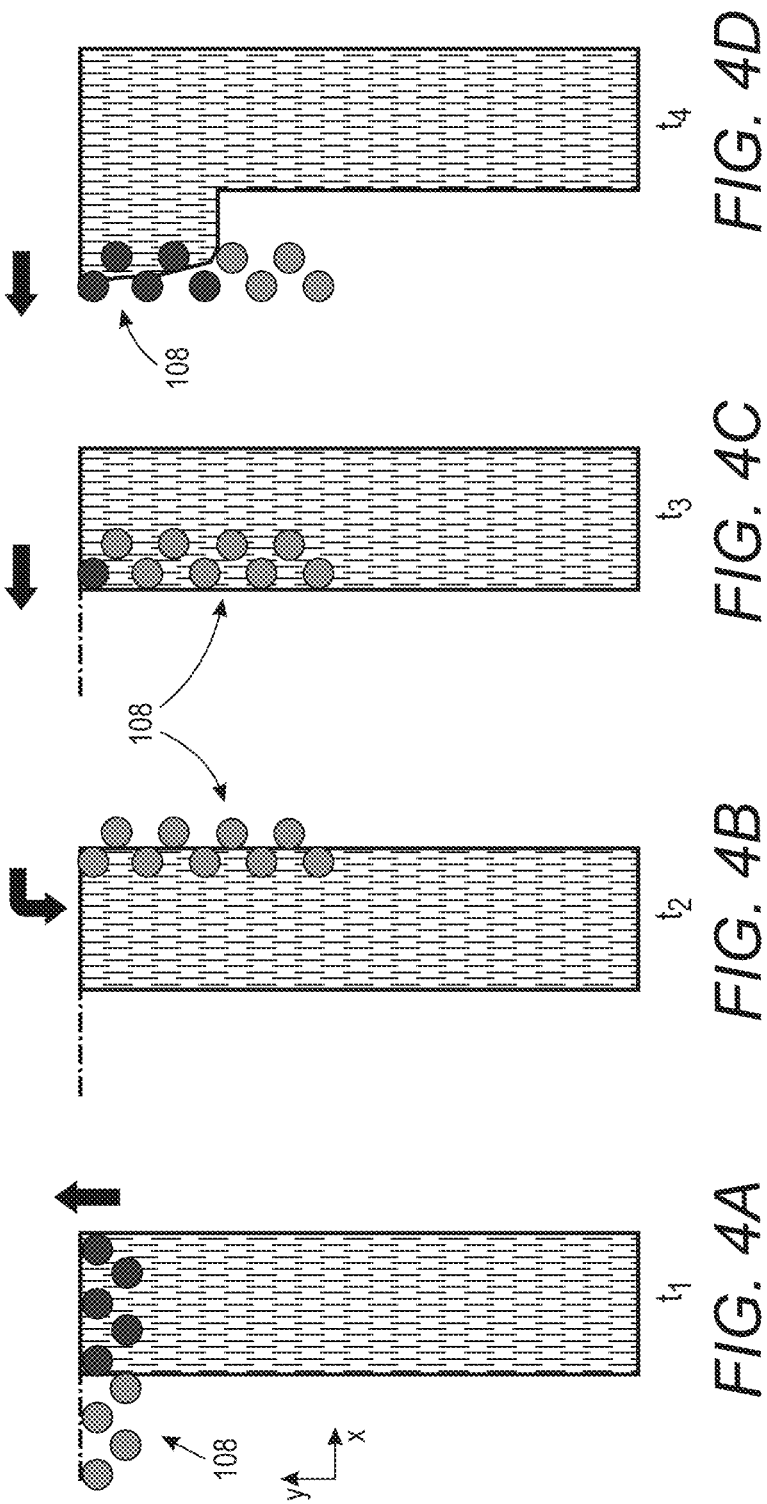
FIG. 4A to FIG. 4D depicts the extruder of FIG. 1 forming a right-angle corner.

FIG. 4A to FIG. 4D illustrate the operation of the extruder 108 to form a right angle corner. In FIG. 4A, the extruder is moving at a heading of 90° with the five rightmost nozzles open until the leading row of nozzles reaches the perimeter. The spool is moved to close all of the nozzles and the extruder is rotated 90° in the clockwise direction about its Z-axis to the position shown in FIG. 4B. To prevent the need for small X and Y movements to realign the end of the nozzle array with the corner, the Z-axis is aligned with the nozzle at the end of the array. The extruder then moves at a heading of 180° while sliding the spool to open the four nozzles at the end of the array as shown in FIG. 4C and FIG. 4D.

Figure 5:
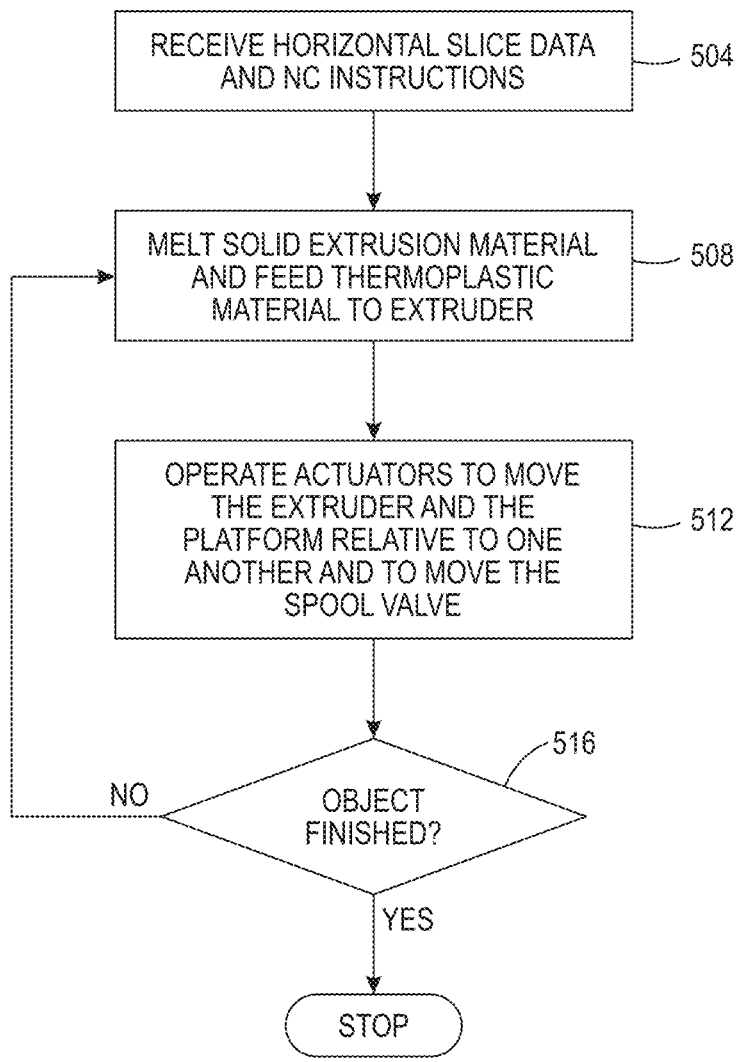
FIG. 5 is a flow diagram of a process for operating the system of FIG. 1.

A process 500 for operating the system 100 is shown in FIG. 5. The process is performed by a controller, such as controller 128, executing programmed instructions stored in a memory operatively connected to the controller and when the controller executes the instructions it processes data and operates components operatively connected to the controller to form the tasks set forth in the flow diagram of the process. The process 500 begins with the controller receiving the horizontal slices and NC programming instructions from a 3D slicer (block 504). The controller operates one of the actuators to feed solid extrusion material into the heater and activates the heater to melt the solid extrusion material to form thermoplastic material that is fed to the inlet of the extruder (block 508). The controller executes the NC programming instructions to operate the actuators that move and rotate the extruder and to operate the actuator operatively connected to the spool to open and close the nozzles selectively (block 512). The operation of the feeding system and the extruder (blocks 508 to 512) continues until the manufacture of the object is completed (block 516).

Figure 6A:
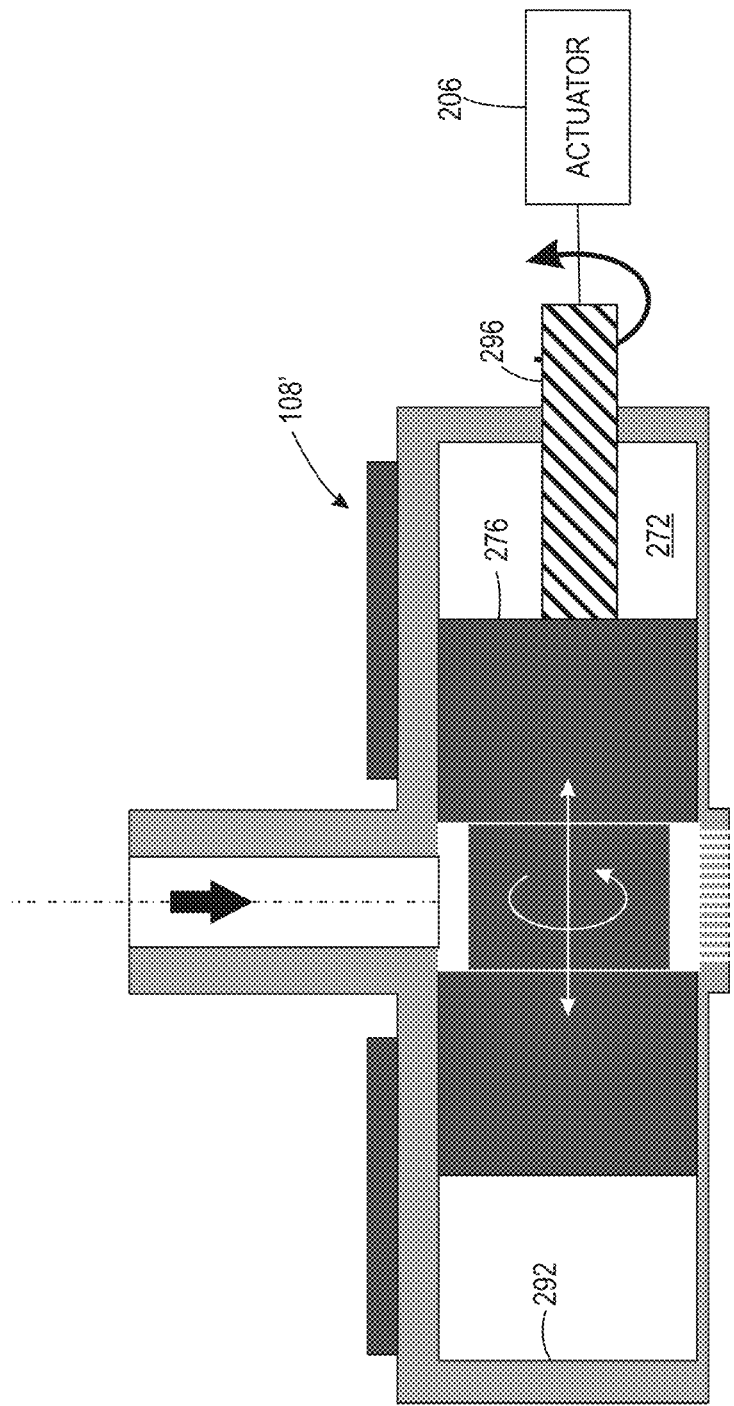
FIG. 6A to FIG. 6D are alternative embodiments of the extruder shown in FIG. 1.
Figure 6B:
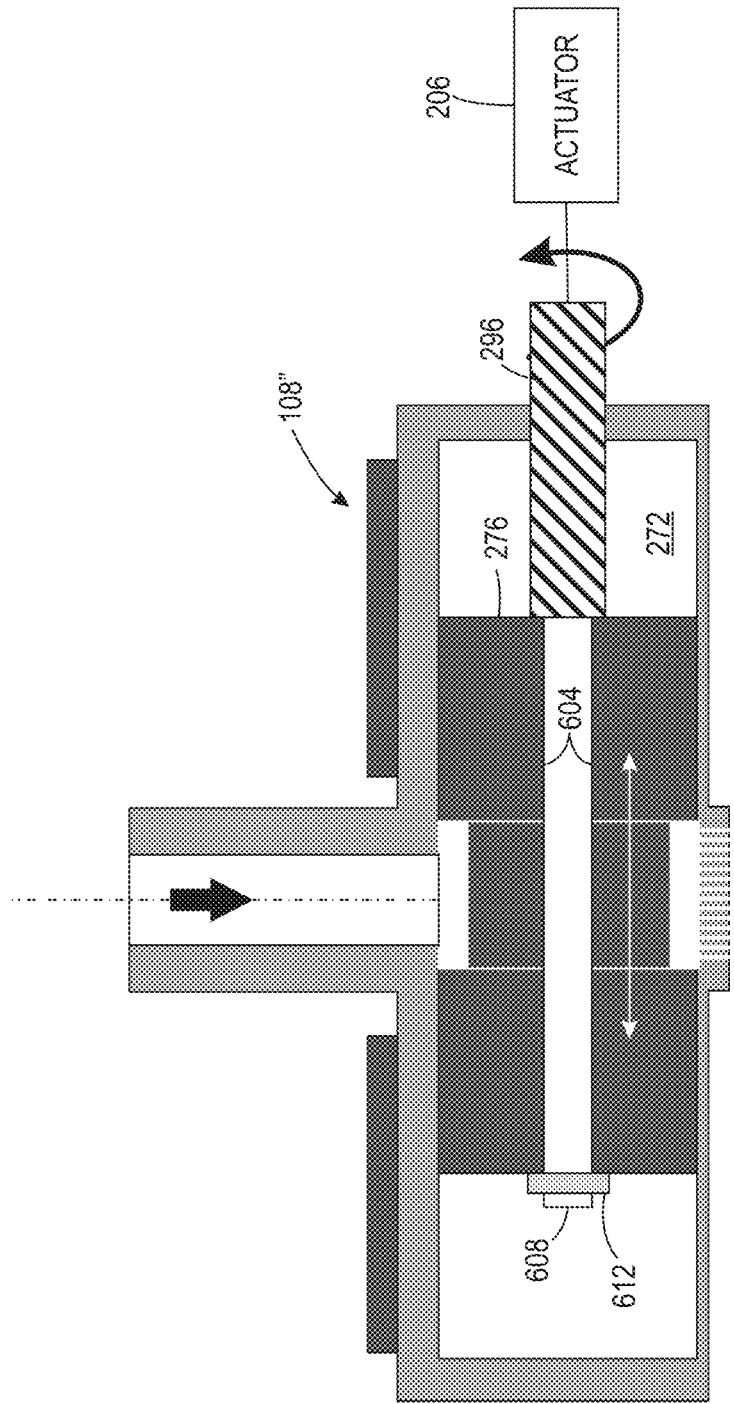
Figure 6C:
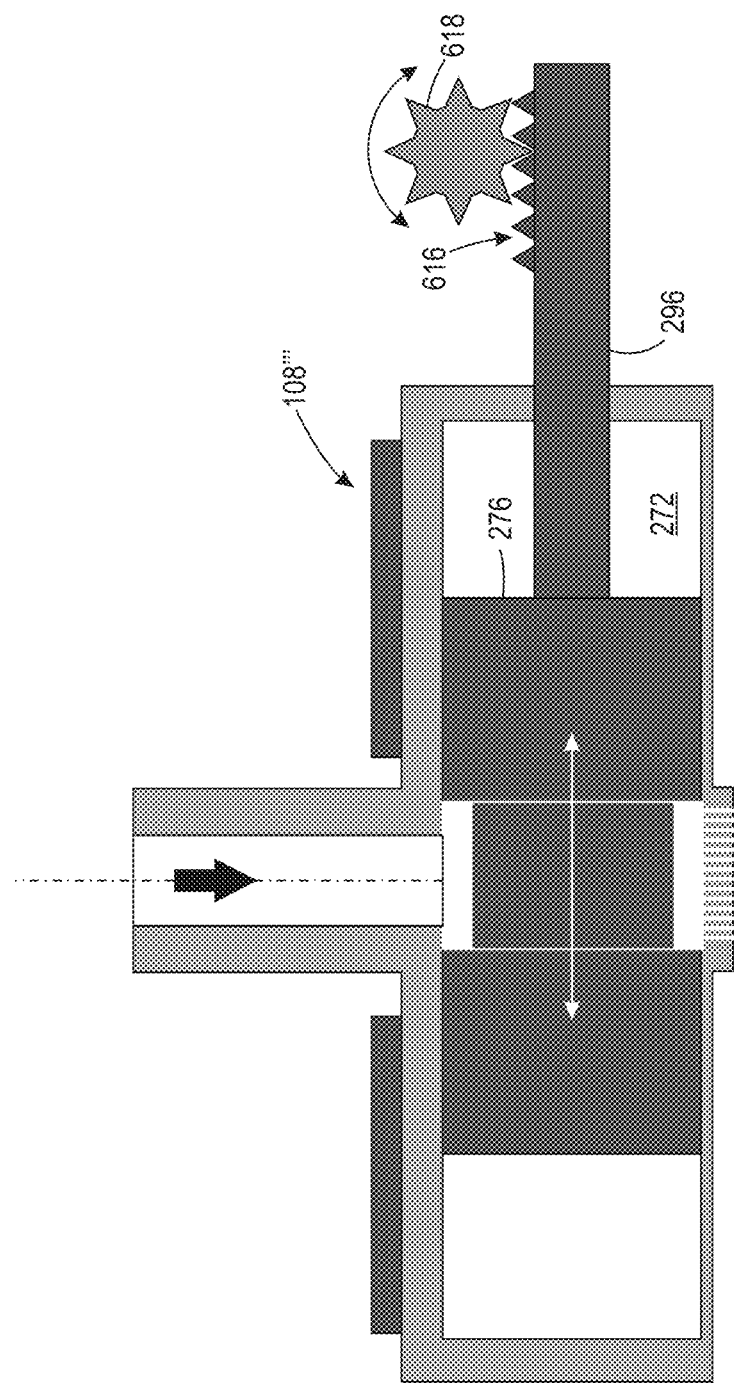

FIG. 6A is side cross-sectional view of an alternative embodiment 108' of the extruder 108. This embodiment is configured without the spring 280. To both advance and retract the spool within the bore of the extruder housing, one end of the member 296 is fixedly attached to the spool 276 and the other end is operatively connected to the actuator 206, which is a fine pitch, rotating adjustment screw that rotates bidirectionally. Thus, when the actuator 206 is operated by the controller 128 (FIG. 1) to rotate in one direction, the member 296 is translated and rotated so the spool 276 advances toward end wall 292 as it rotates about its longitudinal axis. When the actuator 206 is rotated in the opposite direction, it retracts the member 296 and the spool 276 toward end wall 288. The alternative embodiment 108'' shown in FIG. 6B is similar to the one shown in FIG. 6A except the spool 276 is configured with a through bore 604 along its longitudinal axis so the member 296 passes through the spool 276 and the distal end 608 of the member 296 is captured by retaining ring 612. This embodiment operates in much the same manner as the embodiment 108' since the fine pitch adjustment screw 206 is operatively connected to the end of the member 296 that extends outside the extruder housing so operation of the actuator advances and retracts the spool 276 within bore 272. In the alternative embodiment 108''' of FIG. 6C, the member 296 is fixedly attached to the spool 276 and is configured with a linear array of gear teeth 616, also known as a rack. The actuator 206 (FIG. 1) is a bidirectionally rotating pinion gear 618 and the gear teeth of the pinion gear intermesh with the rack 616 on member 296 so operation of the actuator by the controller 128 rotates the pinion gear to advance and retract the spool 276 in the bore 272.

Figure 6D:
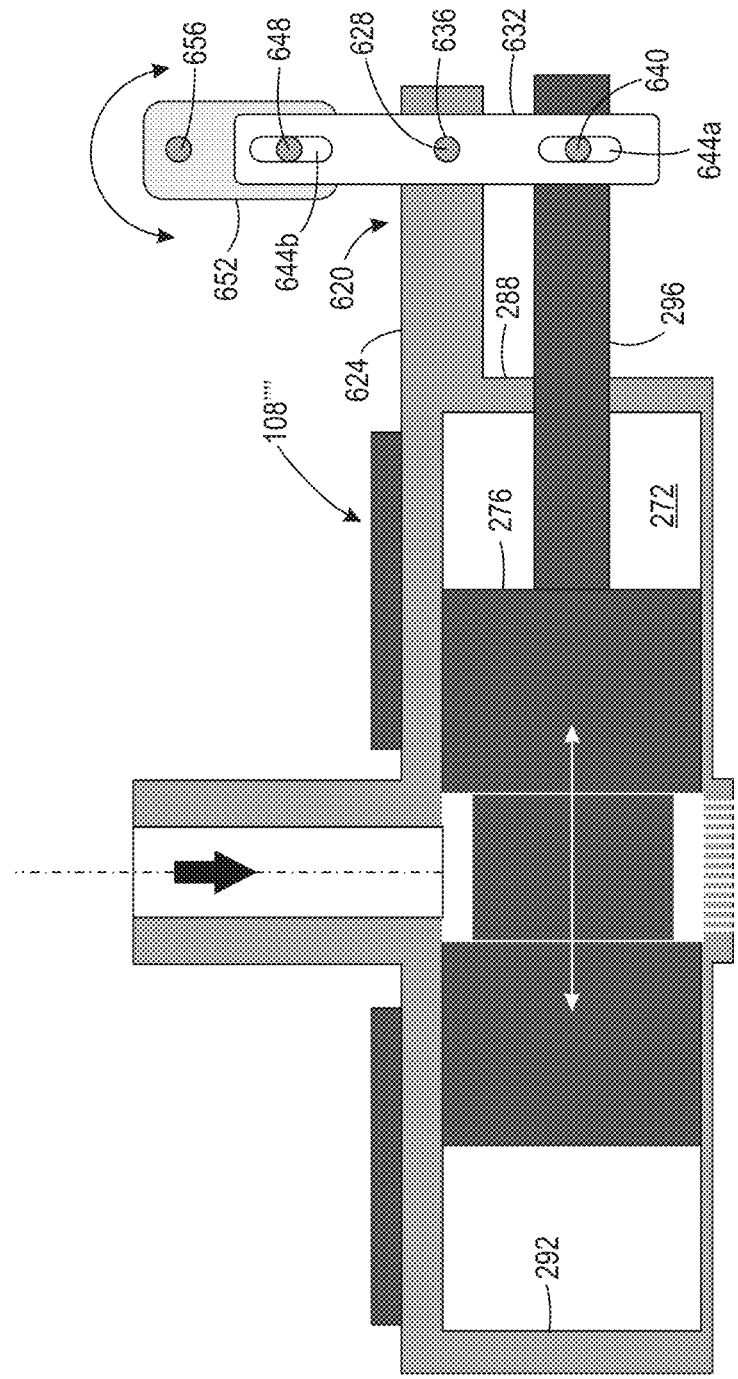
Figure 7:
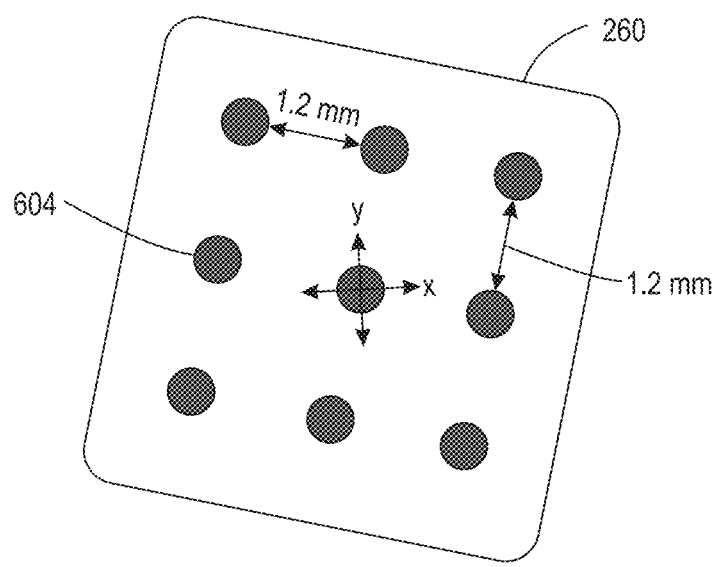
FIG. 7 depicts a faceplate of an extruder shown in the prior art system of FIG. 7.
Figure 9:
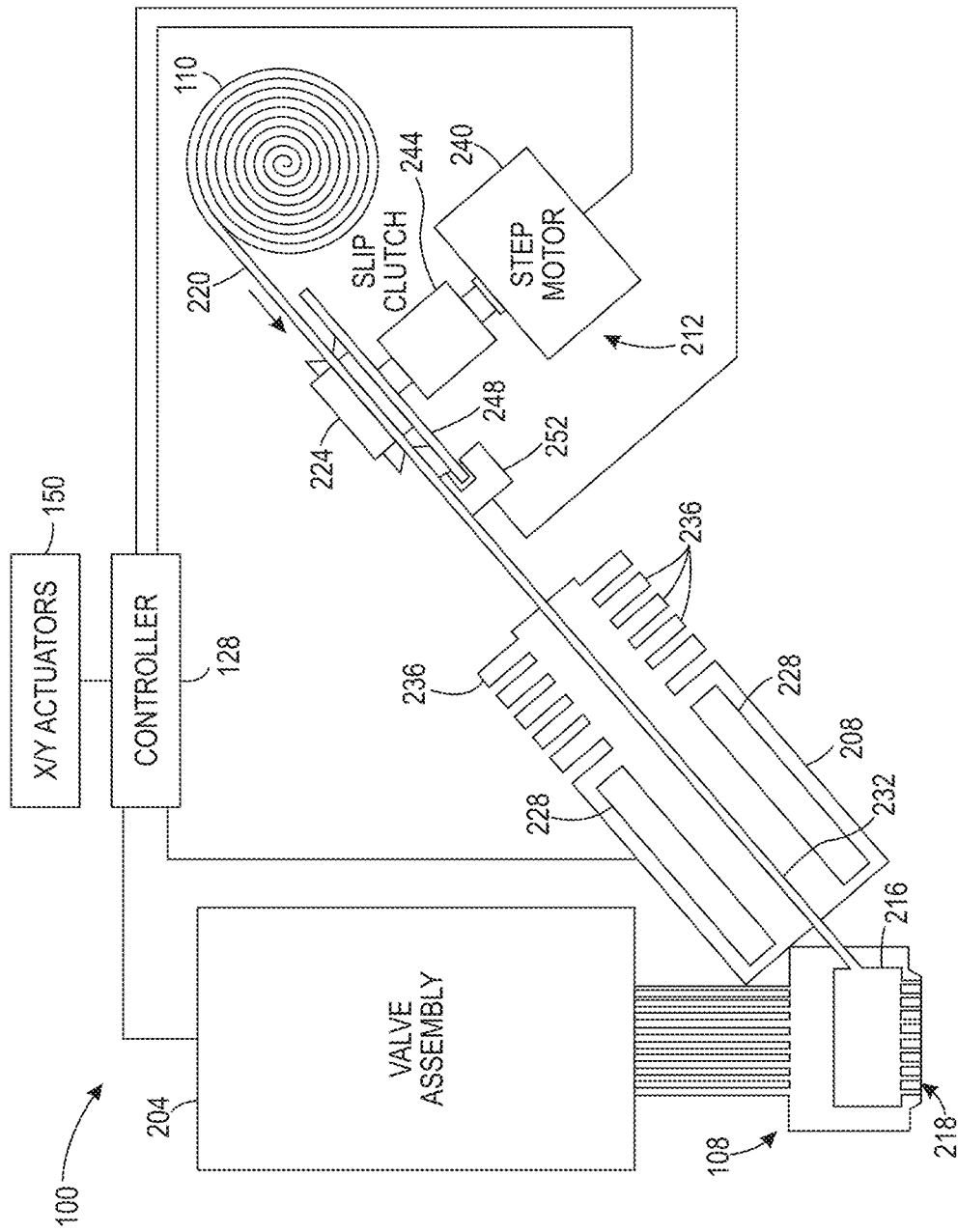
FIG. 9 is a block diagram of a prior art additive manufacturing system having an extruder in which the nozzles are selectively opened and closed using a valve assembly that actuates pins to move within the nozzles.

The alternative embodiment 108'''' shown in FIG. 6D is configured with a link bar arrangement 620 to advance and retract the spool 276. An extension 624 extends from end wall 288 and a pivot pin 628 extends from extension 624 out of the plane of the figure. A linking member 632 has a hole 636 that receives the pivot pin 628 so the linking member can rotate about the pivot pin. Member 296 also has a pivot pin 640 that extends from the member and this pivot pin 640 is parallel to the pivot pin 628. Linking member 632 has two elongated openings or slots 644a and 644b in it. One slot 644a receives the pivot pin 640 and the other slot 644b receives a pivot pin 648 that extends from a driving link 652. Pivot pin 648 is parallel to pivot pins 628 and 640. Driving link 652 is fixedly attached to pivot pin 656 and pivot pin 656 is operatively connected to a rotating actuator 206 (FIG. 1) to rotate the driving link 652 bidirectionally about the pivot pin 656. When the controller 128 operates the actuator 206 to rotate the driving link 652 about pivot pin 656 in the clockwise direction, the pivot pin 648 slides within slot 644b to push the upper end of the linking member 632 in the clockwise direction while the pivot pin 640 slides within slot 644a to push the lower end of the linking member 632 in the counterclockwise direction. This counterclockwise rotation of the linking member 632 about the pivot pin 628 translates the spool 276 toward end wall 288. To advance the spool 276 in the bore 272 toward end wall 292, the actuator is operated to rotate the driving link in the counterclockwise direction so the linking member 632 rotates in the clockwise direction about the pivot pin 628.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An apparatus comprising:
    a platform configured to support an object during manufacturing;
    an extruder having a housing with a cylindrical bore that has a longitudinal axis that extends further in a direction that is parallel to an X-Y plane formed by the platform than the bore does along an axis that is perpendicular to the longitudinal axis of the cylindrical bore and a plurality of nozzles that are formed in a planar member that is affixed to the housing, the cylindrical bore having a single inlet and a single outlet, the single outlet being configured to fluidly communicate with each nozzle in the plurality of nozzles;
    a spool valve being positioned within the cylindrical bore to align with the longitudinal axis of the cylindrical bore;
    at least one actuator operatively connected to the platform or the extruder to move the extruder relative to the platform in an X-Y plane that is parallel with the X-Y plane formed by the platform and to rotate the extruder about the axis that is perpendicular to the longitudinal axis of the cylindrical bore;
    a spool actuator operatively connected to the spool valve, the spool actuator being configured to move the spool valve along the longitudinal axis of the cylindrical bore bidirectionally; and
    a controller operatively connected to the extruder, the at least one actuator, and the spool actuator, the controller being configured to:
        operate the at least one actuator to move the extruder in the X-Y plane parallel to the X-Y plane formed by the platform and rotate the extruder about the axis that is perpendicular to the longitudinal axis of the cylindrical bore; and
        operate the spool actuator to move the spool valve along the longitudinal axis of the cylindrical bore in the housing to open and close nozzles in the planar member selectively while the extruder is being moved in the X-Y plane that is parallel to the X-Y plane formed by the platform.

2. The apparatus of claim 1, the spool valve further comprising:
    a cylindrical member positioned within the cylindrical bore of the housing, the cylindrical member having two end portions with a first diameter that approximates a diameter of the cylindrical bore and a central portion having a second diameter that is less than the first diameter.

3. The apparatus of claim 2, the spool valve further comprising:
    a biasing member positioned between and contacting an end wall of the housing and one end portion of the cylindrical member.

4. The apparatus of claim 3 wherein the biasing member is a spring.

5. The apparatus of claim 2 wherein the cylindrical member has a bore therethrough that is aligned with the longitudinal axis of the cylindrical bore and a portion of a member passes through the bore of the cylindrical member; and
    the apparatus further comprising:
        a retaining ring configured to secure the member to the cylindrical member.

6. The apparatus of claim 2, the apparatus further comprising:
    a member fixedly attached to the cylindrical member, wherein the member includes a rack of gear teeth along a portion of the member outside of the extruder housing;
    a pinion gear having gear teeth arranged about a circumference of the pinion gear, the gear teeth of the pinion gear intermeshing with the rack of gear teeth on the member and the spool actuator being operatively connected to the pinion gear; and the controller being further configured to operate the spool actuator to rotate the pinion gear to translate the member and move the cylindrical member within the cylindrical bore of the extruder housing.

7. The apparatus of claim 2 further comprising:
a member fixedly attached to the cylindrical member;
an extension member extending from the extruder housing;
a pivot pin perpendicularly extending from the extension member;
a rotating member having a first end and a second end, the rotating member being configured to receive the pivot pin and rotate bidirectionally about the pivot pin, the first end of the rotating member being operatively connected to the member and the second end of the rotating member being operatively connected to the spool actuator; and
the controller being further configured to operate the spool actuator to rotate the rotating member about the pivot pin in a first direction to move the cylindrical member along the longitudinal axis of the cylindrical bore in a direction opposite to the first direction and to rotate the rotating member in a second direction to move the cylindrical member along the longitudinal axis of the cylindrical bore in a direction opposite to the second direction.

8. The apparatus of claim 2 further comprising:
at least one seal encircling an outer circumference of the cylindrical member.

9. The apparatus of claim 2 wherein the diameters of the two end portions of the cylindrical bore are less than 10 microns of a diameter of the bore in the housing.

10. The apparatus of claim 3 further comprising:
a member extending from the one end portion of the cylindrical member opposite the one end portion contacting the biasing member; and
the spool actuator is operatively connected to the member to move the cylindrical member.

11. The apparatus of claim 10 wherein the member is a screw and the spool actuator is configured to rotate the screw to move the cylindrical member.

12. The apparatus of claim 11 wherein a distal end of the screw is fixedly attached to the cylindrical member and operation of the spool actuator both translates and rotates the cylindrical member.

13. The apparatus of claim 1 wherein the nozzles are arranged in at least two rows in the planar member, the two rows being parallel to the longitudinal axis of the cylindrical bore.

14. The apparatus of claim 13 wherein the nozzles in one of the rows is offset from the nozzles in the other row in a cross-process direction so the nozzles of the one row are interspersed with the nozzles in the other row.

15. The apparatus of claim 13, the controller being further configured to:
rotate the extruder about the axis perpendicular to the longitudinal axis of the cylindrical bore so a longitudinal axis of the at least two rows of nozzles is perpendicular to a direction of movement of the extruder.

\* \* \* \* \*